Figure 1:
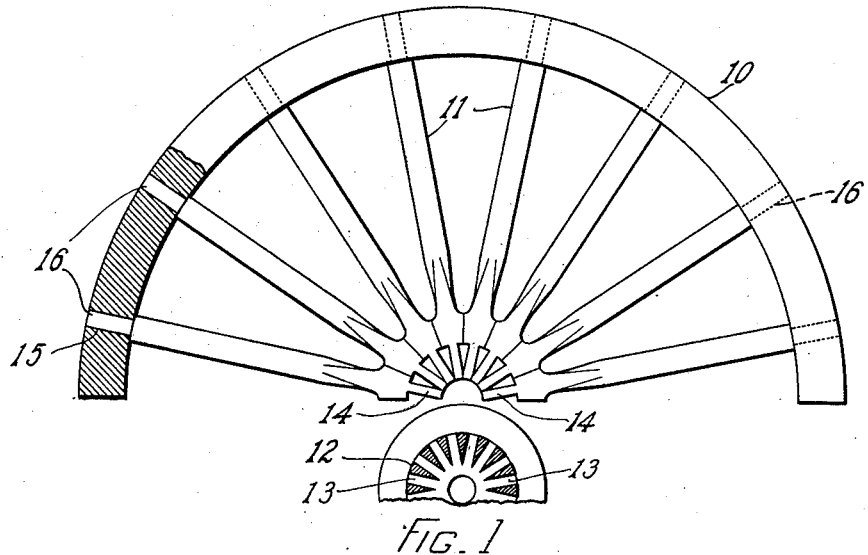

E. H. ARCHIBALD.
PROCESS OF MANUFACTURE OF WHEELS.
APPLICATION FILED APR. 26, 1907.

1,098,007.

Patented May 26, 1914.

3 SHEETS—SHEET 1.

WITNESSES
A. T. Palmer
Oliver P. Schoonmaker

INVENTOR
EVERETT H. ARCHIBALD
By His Attorney
Everett E. Kent

E. H. ARCHIBALD.
PROCESS OF MANUFACTURE OF WHEELS.
APPLICATION FILED APR. 26, 1907.
1,098,007.
Patented May 26, 1914.
3 SHEETS—SHEET 2.
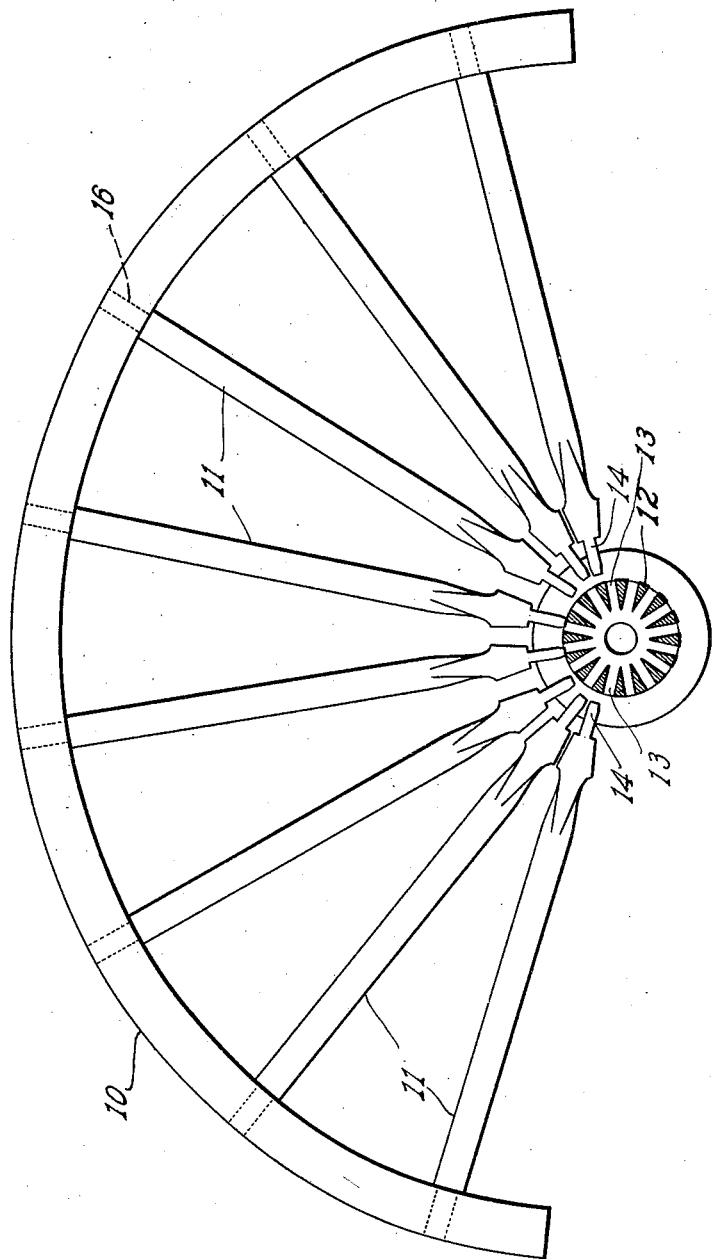
WITNESSES
INVENTOR
EVERETT H. ARCHIBALD
BY HIS ATTORNEY

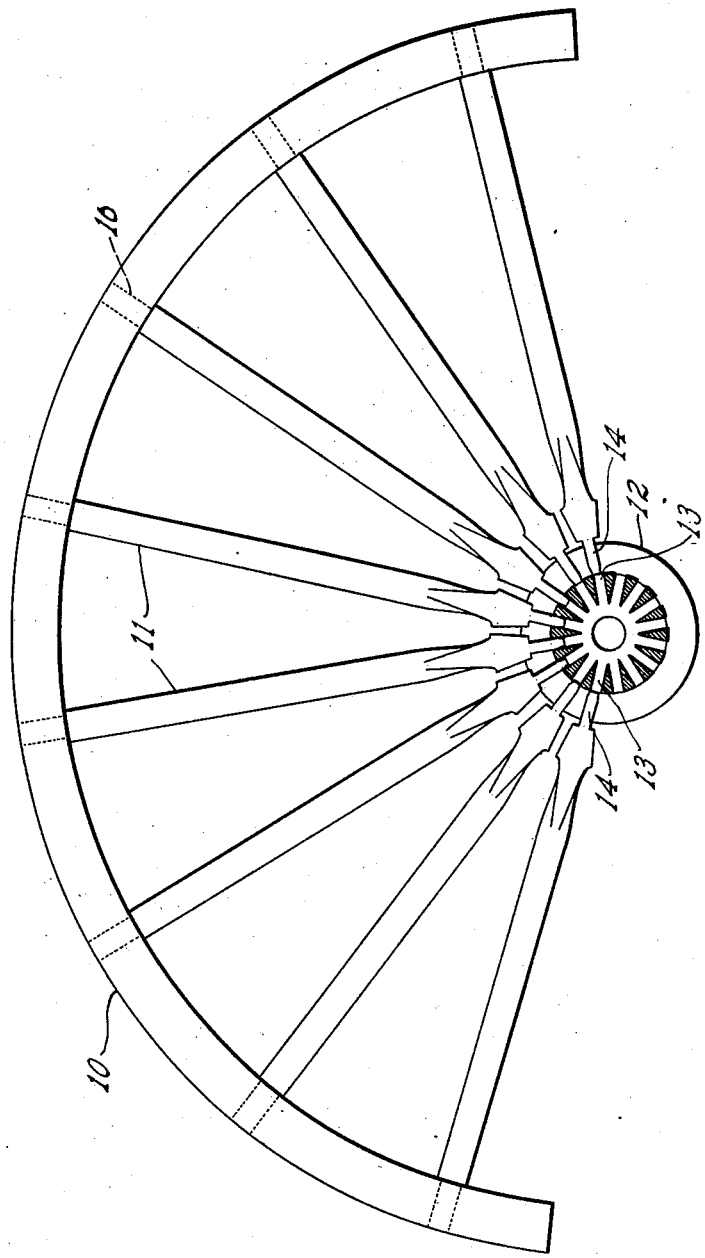

UNITED STATES PATENT OFFICE.

EVERETT H. ARCHIBALD, OF METHUEN, MASSACHUSETTS, ASSIGNOR TO ARCHIBALD WHEEL COMPANY, OF LAWRENCE, MASSACHUSETTS, A CORPORATION OF MASSACHUSETTS.

PROCESS OF MANUFACTURE OF WHEELS.

1,098,007.  Specification of Letters Patent.  Patented May 26, 1914.

Application filed April 26, 1907. Serial No. 370,528.

*To all whom it may concern:*

Be it known that I, EVERETT H. ARCHIBALD, of Methuen, in the county of Essex and State of Massachusetts, have invented certain new and useful Improvements in Processes of Manufacture of Wheels, of which the following is a specification.

This invention relates to an improved process of manufacture of wheels.

More particularly, it relates to vehicle wheels having wooden spokes set in mortises in the hub, and to the method of assembling the hub, spokes and felly. The rim of such a wheel is preferably made with but two fellies, each running around half the circumference. Difficulty is experienced in assembling, because the mortises in the hub lie at divergent angles; likewise the mortises in the felly are divergent; and each spoke must be driven in a different direction from all the other spokes.

The invention applies to wheels in which the tenons at the ends of the spokes fill and fit tightly their respective mortises in the felly and hub, and in this respect is to be distinguished from any loosely assembled wheel in which the parts, owing to shrinkage of wood, or owing to the size and shape of tenon and mortise relative to each other, would not make a tight fit when thus inserted.

In the new process the spokes are first assembled in the felly, which is preferably in semi-circular form. The felly is next de-formed into a flattened semi-circular shape. In doing this no stress is imposed upon the spokes, but they are, by the de-formation of the felly, spread apart so that the inner ends of the spokes are separated, and their tenons thus spread are accessible to the mortises prepared for them in the hub. The middle tenons are next entered in their mortises; and the felly is then gradually returned to its semi-circular form, pressure of the felly toward the hub being maintained from all directions simultaneously, with the result that the central tenons above mentioned and the tenons adjacent to them on each side are simultaneously pressed home in their respective mortises in the hub. During this step the tenons enter their respective mortises smoothly without excessive bending stress being imposed on any part for the reasons and in the manner hereinafter more fully explained.

The accompanying drawings represent different stages of the process, in which—

Figure 4:
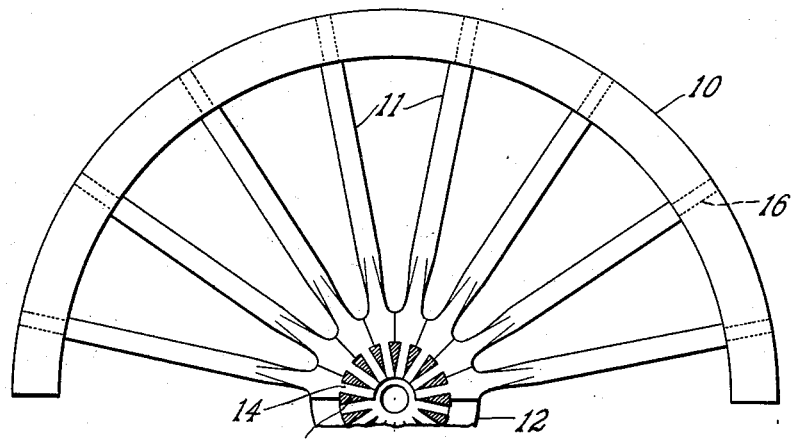
Figure 5:
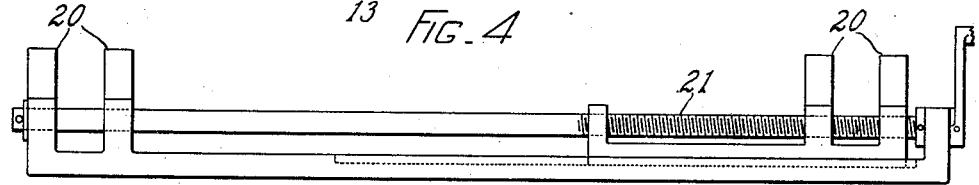

Figure 1 represents a felly with spokes assembled therein, and the hub in which the spokes are to be inserted. Fig. 2 represents the felly de-formed. Fig. 3 represents the felly in process of re-forming, with the spokes simultaneously entering their mortises in the hub. Fig. 4 represents the parts with the spokes completely inserted in the hub. Fig. 5 represents a jack that may be used to de-form the felly.

Referring to the drawings: 10 indicates the felly of a wheel having, when complete, sixteen spokes, according to ordinary practice. The spokes are marked 11, the hub 12, the mortises in the hub 13 and their tenons 14, and the mortises in the felly 15 and their tenons 16. Any suitable apparatus may be employed to assist in the various steps of the process herein described. One element of such apparatus may be a jack employed to de-form the semi-circular felly by spreading its ends apart. Such jack is represented in the drawings as having jaws 20 movable by a screw 21. In performing the process the felly is to be de-formed from the shape shown in Fig. 1 by the use of the jack, as indicated in Fig. 5, or by other suitable means, until the hub ends of the spokes, which previously have been set in the felly, are separated, so that the hub tenons of the outer spokes are as far apart as the mortises in the hub which they respectively are to enter. When thus deformed a bending stress is sustained by the felly, but no stress is imposed upon the spokes in any respect, and they assume positions and change their angular arrangement relative to one another, depending wholly upon the movement of the particular portion of the felly to which they are severally attached. When spread, as above indicated, the stock may behave differently in different cases, owing to the differences which are always inherent in different pieces of wood. The drawings illustrate actual experience in one case in which the felly when thus de-formed took a shape such that the middle tenons were spread a little more than their respective mortises. It is found, however, that even in working with the heaviest of stock the two central spokes may be readily sprung together by the operator's hand a sufficient distance to enable them to enter their respective mortises. The total amount of movement of the tenon end thus to be accomplished in order to enter it in its mortise is very little, and the bending of parts incidental to such movement is distributed throughout the length of the two spokes, and the felly between them probably also participates to some degree, so that it is readily accomplished. If the central spokes should chance to require further separation by the fingers, that may easily likewise be accomplished; but it is not unlikely that in some cases the tenon ends may be found directly opposite their mortises without further adjustment. In either case the ends of the central tenons are to be inserted into their mortises. This being done, pressure is applied tending to force them home therein, and at the same time the de-forming force is relaxed, and the felly gradually is re-formed into a semi-circle. During this step the tenons of the spokes on each side of the center successively enter their respective mortises, being sprung slightly by the hand, if necessary, and are then all pressed home by simultaneous pressure on the felly from all directions toward the hub. One stage of this is shown in Fig. 3 and the completion of it in Fig. 4, this step being accomplished by the conjoint effect of the elasticity of the felly and external pressure which may be either continuous by any suitable means, as a press, or which may be exerted by blows of a mallet. It will be noticed in Fig. 2 that when the middle tenons are inserted they are almost directly in line with their respective hub mortises, so that the bending of these spokes as their tenons go in is slight, and the stress is not sufficient to be dangerous or to cause a fracture. The spokes next to these on each side are somewhat less in line with their mortises, but coincidently with the partial insertion of the central tenons into the hub and the partial re-formation of the felly to let the adjacent ones in, these spokes become more in line with their mortises. Such bending as occurs is, however, so slight and is distributed over such length of spoke and felly, that the bending stress in entering these and subsequent tenons is not comparable to that which occurs when the spokes are first inserted in the hub and afterward bent to reach their felly tenons, as commonly heretofore practised. According to the present invention, as the various tenons enter their mortises, the gradual re-forming of the felly and the incidental approach of the outer ends of the spokes to their normal positions as pictured in Figs. 1 and 4 coincides with the gradual approach of the hub tenon ends to each other as they enter their mortises, thus continuing a condition of minimum stress. After being thus assembled the inwardly projecting ends of the spoke tenons may be reamed out and the wheel otherwise finished in any ordinary or suitable manner. The ends of the tenons may be beveled a little to facilitate their initial entrances into their mortises, and these beveled ends are subsequently removed during the reaming process to core out the hub to fit the box, leaving the body of the tenons and the shoulders at the bases of the tenons accurately fitting both the hub and the felly.

As the spoke does not have to be sprung materially from its normal true radial position between its hub and felly mortises, each mortise may be made of uniform size throughout, and the tenon may be made to fit it with exactness, instead of making either the tenons or the mortises conical as sometimes practised heretofore; and there is no necessity to split and wedge the tenon end in order to make it a nearer approach to a fit. By the new method a wheel having a mortised hub can be assembled at materially less expense of time and labor than heretofore, with a more accurate fit of the parts together, with less strain upon the parts, absolutely without danger of breakage of spokes or tenons, and without loosening glue at the hub by the springing of the spokes in order to enter the rim mortises after the manner heretofore practised.

While the drawing shows the process as applied to a wheel having semi-circular felly, it is obvious that the method may be applied with equal facility to a wheel whose rim is composed of fellies covering a different length of arc, if desired. It is also obvious that while the preferred original form of the felly is that of a circular arc, as here shown, the process might be practised by forming the felly originally in the shape here shown as the deformed shape, and completing the wheel as described. In that event the felly would be subject to considerable internal strain in its final position.

I claim:

1. The method of manufacture of a wheel, comprising the assembly of spokes in the felly, the de-formation of the felly by outward flexure, and the re-formation of the felly by inward flexure, with tenons entering mortises in the hub, the said tenons being of size filling and fitting tightly said mortises, in the circumferential direction.

2. The method of manufacture of a wheel, comprising the assembly of spokes in the felly, de-formation of the felly by outward flexure, and re-formation of the felly with inward pressure, forcing the spokes into mortises in the hub, said spokes having tenons of size filling and fitting tightly said mortises, in the circumferential direction.

3. The method of manufacture of a wheel, by applying a mortised hub to a set of spokes assembled in a felly, having a form of curvature flatter than the circular curvature of the completed wheel, and pressing the spokes into the hub, thereby forming the felly into circular curvature, said spokes having tenons of size filling and fitting tightly said mortises, in the circumferential direction.

4. The method of manufacture of a wheel, consisting of the assemblage of spokes in a felly of approximately circular curvature, bringing the inner ends of the spokes to positions of access to their mortises in the hub by bending the felly outward, and insertion in their mortises by pressure exerted in approximately radial direction, said spokes having tenons of size filling and fitting tightly said mortises, in the circumferential direction.

5. The method of manufacture of a wheel, comprising the assemblage of spokes in a felly of circular arc form; flexure of the felly outward, de-forming the arc; bending the spokes, if necessary, so that their tenons register with their mortises in the hub; and re-flexion of the felly to circular arc form, accompanied with pressure upon the spokes toward the hub, forcing their tenons to enter the mortises, the said tenons being of size filling and fitting tightly said mortises, in the circumferential direction.

6. The method of manufacture of a wheel, comprising the assemblage of spokes in the felly, and the subsequent insertion of the spokes in mortises in the hub by pressure exerted upon all approximately simultaneously, said spokes having tenons of size filling and fitting tightly said mortises in the circumferential direction.

In testimony whereof I hereto affix my signature, in presence of two witnesses.

EVERETT H. ARCHIBALD.

Witnesses:
EVERETT E. KENT,
WILLIAM H. WINSHIP.